(12) United States Patent
Paulsen (10) Patent No.: US 7,984,914 B1
(45) Date of Patent: Jul. 26, 2011

(54) ATTACHMENT SYSTEM WITH A REMOVABLE AND REPLACEABLE TONGUE FOR USE WITH A RECIPROCATING DRIVER

(76) Inventor: Scott A. Paulsen, Saukville, WI (US)

( * ) Notice: Subject to any disclaimer, the term of this patent is extended or adjusted under 35 U.S.C. 154(b) by 674 days.

(21) Appl. No.: 11/759,069

(22) Filed: Jun. 6, 2007

Related U.S. Application Data (60) Provisional application No. 60/804,047, filed on Jun. 6, 2006.

(51) Int. Cl.
*B23B 31/22* (2006.01)

(52) U.S. Cl. .............. 279/144; 279/22; 279/75; 279/89; 279/97; 279/143; 279/905; 30/392

(58) Field of Classification Search .......... 279/143–145, 279/22, 30, 75, 83, 86, 89, 97, 104, 905; 30/166.3, 335, 337, 340, 392, 394; *B23B 31/22, B23B 31/107*
See application file for complete search history.

(56) References Cited

U.S. PATENT DOCUMENTS

| | | | |
|---|---|---|---|
| 2,475,041 A * | 7/1949 | Mattson | 173/132 |
| 3,373,779 A * | 3/1968 | Taft | 30/394 |
| 4,209,182 A | 6/1980 | Sheldon | |
| 4,365,397 A | 12/1982 | Felpel | |
| 4,858,939 A | 8/1989 | Riggs | |
| 4,901,588 A | 2/1990 | Zudal | |
| D333,765 S | 3/1993 | Tamanaha | |
| 5,398,946 A | 3/1995 | Quiring | |
| 5,575,071 A | 11/1996 | Phillips et al. | |
| 5,647,133 A | 7/1997 | Dassoulas | |
| 5,759,093 A | 6/1998 | Rodriguez | |
| 5,794,352 A | 8/1998 | Dassoulas | |
| 5,941,764 A | 8/1999 | Yang | |
| 5,957,634 A * | 9/1999 | Carpinetti | 408/226 |
| 6,053,675 A * | 4/2000 | Holland et al. | 408/239 R |
| 6,142,715 A | 11/2000 | Fontaine | |
| 6,145,851 A * | 11/2000 | Heber | 279/143 |
| 6,171,033 B1 * | 1/2001 | Wrobel | 408/239 R |
| 6,237,179 B1 | 5/2001 | Balciero | |
| 6,311,989 B1 | 11/2001 | Rosanwo | |
| 6,546,633 B1 * | 4/2003 | Lovell et al. | 30/517 |
| 6,561,523 B1 | 5/2003 | Wienhold | |
| 6,755,424 B1 | 6/2004 | Paulsen | |
| 7,052,022 B2 * | 5/2006 | Chudy et al. | 279/143 |
| 7,497,647 B2 * | 3/2009 | Cornwell | 408/115 R |
| 7,631,584 B2 * | 12/2009 | Quinn | 83/13 |
| 2005/0144791 A1 * | 7/2005 | Ritter et al. | 30/392 |

FOREIGN PATENT DOCUMENTS

WO    WO 01/13802    3/2001

* cited by examiner

*Primary Examiner* — Eric A Gates
(74) *Attorney, Agent, or Firm* — Boyle Fredrickson, s.c.

(57) ABSTRACT

A system for use in securing an attachment to a driver having an attachment mounting area includes an attachment mount configured for releasable engagement with an attachment as well as a driver mount interconnected with the attachment mount. The driver mount includes a removable mounting member configured for engagement with the attachment mounting area of the driver.

20 Claims, 6 Drawing Sheets

ATTACHMENT SYSTEM WITH A REMOVABLE AND REPLACEABLE TONGUE FOR USE WITH A RECIPROCATING DRIVER

CROSS-REFERENCE TO RELATED APPLICATION

This application claims the benefit of U.S. provisional application 60/804,047, filed Jun. 6, 2006, the disclosure of which is incorporated herein by reference.

BACKGROUND AND SUMMARY OF THE INVENTION

This invention relates to power tools, and more particularly to a quick-change system for releasably securing a tool to a reciprocating driver or power unit.

A reciprocating power saw typically includes a hand-held power unit or driver which is operable to impart reciprocating motion to a blade attachment arrangement. A conventional saw blade for a reciprocating power saw of this type has a flat inner end formed with a tang and an aperture, which is adapted to be clamped to the blade attachment arrangement to securely retain the blade in place. In this manner, reciprocating motion is imparted to the blade in response to operation of the power unit. The clamp-type blade attachment member requires use of a tool, such as a screwdriver or an alien wrench, to remove and replace the blade.

The reciprocating driving output of a hand-held power unit of this type is suitable for a variety of functions other than the normal sawing function accomplished by use of a saw blade mounted to the unit, including filing, brushing, buffing, etc. In order to accomplish such functions, however, it is necessary to provide appropriate attachments or functional tools that have a specially configured mounting end that is compatible with the clamp-type mounting arrangement member of the power unit. In order to change attachments for different functions, it is necessary to use a tool such as an alien wrench or a screwdriver to remove one type of attachment and replace it with another, to accomplish a different function. This entails a significant amount of time and inconvenience, and requires an operator to always have a tool such as alien wrench or screwdriver at the ready when it is desired to change tools to adapt the power unit for a different function.

U.S. Pat. No. 6,755,424 to Paulsen describes a mounting arrangement for securing a functional tool to a power unit having a reciprocating output. The mounting arrangement includes an adapter that is engageable with a clamp-type mounting mechanism associated with the output of the power unit. The adapter remains in place in engagement with the power unit, and includes an outer releasable engagement arrangement which is adapted to releasably secure the inner end of a functional tool, such as a file or brush, to the power unit through the adapter. The outer releasable engagement arrangement of the adapter includes a passage within which the inner mounting portion of the functional tool is received. The inner mounting portion of the functional tool further includes a groove, and the releasable engagement arrangement includes a retainer member selectively movably into and out of the groove for maintaining the functional tool in engagement with the adapter and for releasing engagement between the functional tool and the adapter. The outer engagement arrangement is operable without the use of tools, to provide quick and easy engagement of the functional tool with the power unit, and quick and easy removal of the functional tool for replacement by another, differently configured functional tool.

Notwithstanding the advancements presented in U.S. Pat. No. 6,755,424, the present inventor has discovered that the reciprocating output of the power unit may damage or otherwise degrade the adapter constructed to interface with a functional tool. In particular, the end of the adapter that interfaces with the power unit may become damaged or unusable even though the end of the adapter that receives the functional tool remains usable.

Accordingly, it is an object of the present disclosure to provide an adapter, usable with a power unit having a reciprocating output, which has a removable and replaceable mounting member that interfaces with the power unit. In this regard, the mounting member, once damaged or rendered unworkable, may be replaced without requiring full replacement of the adapter itself.

Therefore, in accordance with one aspect, the present invention is directed to a system for use in securing an attachment to a driver having an attachment mounting area. The system includes an attachment mount configured for releasable engagement with an attachment as well as a driver mount interconnected with the attachment mount. The driver mount includes a removable and replaceable mounting member configured for engagement with the attachment mounting area of the driver.

In accordance with a further aspect, the present invention is directed to a power tool having a hand-held power unit that includes an axially reciprocating movable output arrangement. The power tool includes a driver mount adapted for engagement with the axially reciprocating movable output arrangement using a clamp-type mounting arrangement. An adapter is provided that has a generally flat first connector section that is adapted for releasable engagement with the driver mount and a second connector section having a releasable engagement arrangement. The power tool further includes a functional tool having an inner mounting portion, wherein the inner mounting portion of the functional tool and the releasable engagement arrangement of the second connector section of the adapter are configured and arranged so as to provide engagement of the inner mounting portion of the functional tool with the releasable engagement arrangement without the use of tools. The inner mounting portion of the functional tool is engaged with the releasable engagement arrangement of the second connector section via application of a push-on force to the inner mounting portion of the functional tool in a direction parallel to the direction of movement of the axially reciprocating movable output arrangement of the power unit.

According to another aspect of the present invention, a method of securing a tool to a reciprocating driver having a tool mount area is disclosed. The method includes the acts of providing a body having an outer end configured to engage a tool and an inner end defining a driver mount area, and releasably securing a mounting member to the driver mount area. The mounting member is configured for engagement with the tool mount area. The method further includes the act of engaging a tool with the outer end of the body.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE INVENTION

Figure 1:
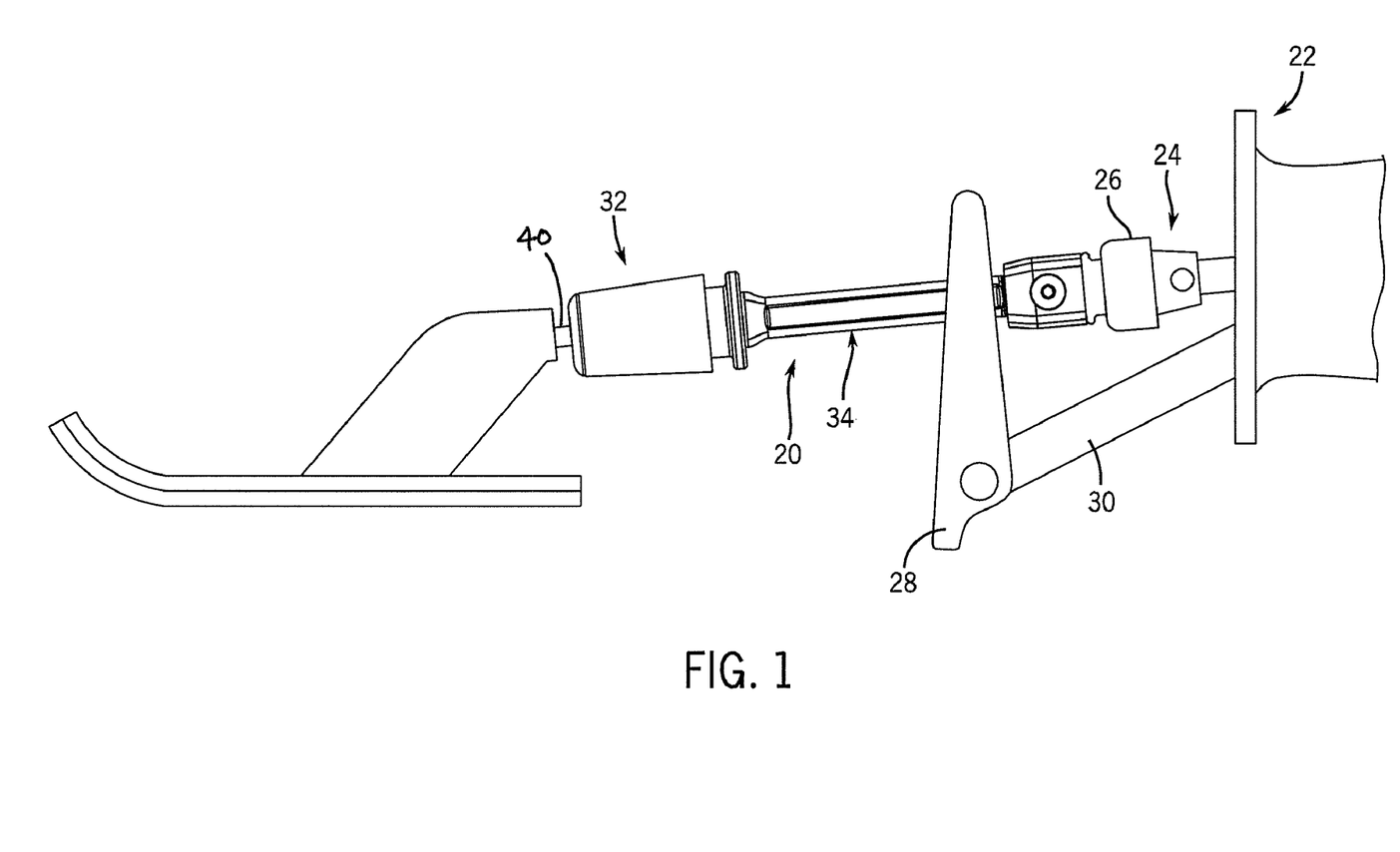
FIG. 1 is an elevation view illustrating a hand-held power unit and a functional tool connected thereto, using an adapter in accordance with the present invention for mounting the functional tool to the power unit in a quick-change, tool-less manner.

Referring now to FIG. 1, a quick change tool attachment 20 is adapted for use in connecting a tool or attachment, such as a sanding shoe, to a driver, such as a reciprocating saw. A representative driver may a reciprocating driver such as is available from Milwaukee Electric Tool under its designation SAWZALL. The end of the driver is shown at 22, and includes a tool connection area 24. In accordance with known construction, tool connection area 24 includes an outwardly facing slot within which the end of a tool or attachment is adapted to be received. Tool connection area 24 also includes a lever 26 that operates a clamp-type tool engagement mechanism for securely retaining the tool or attachment within the slot in tool connection area 24. Driver 22 may also include a shoe 28 spaced outwardly from tool connection area 24 and secured to the driver end 22 via a bracket 30.

Quick change tool attachment 20 is configured for engagement with tool connection area 24 of the reciprocating driver, and is adapted for use in mounting a variety of different tools or attachments to the driver. The end of quick change tool attachment 20 includes a quick change socket assembly 32, which provides quick and easy engagement and disengagement of a tool with tool attachment 20. Quick change socket assembly 32 is constructed as shown and described in Paulsen U.S. Pat. No. 6,755,424, the disclosure of which is incorporated herein by reference.

Figure 2:
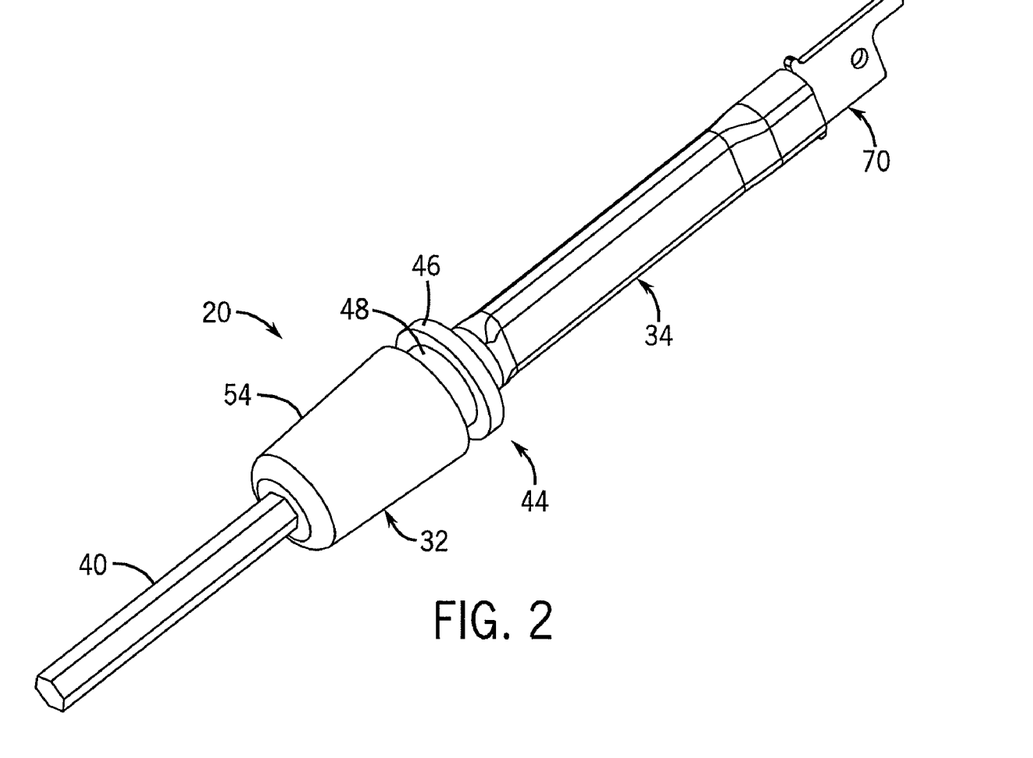
FIG. 2 is an isometric view of the adapter holding an arm of the functional tool shown in FIG. 1.
Figure 3:
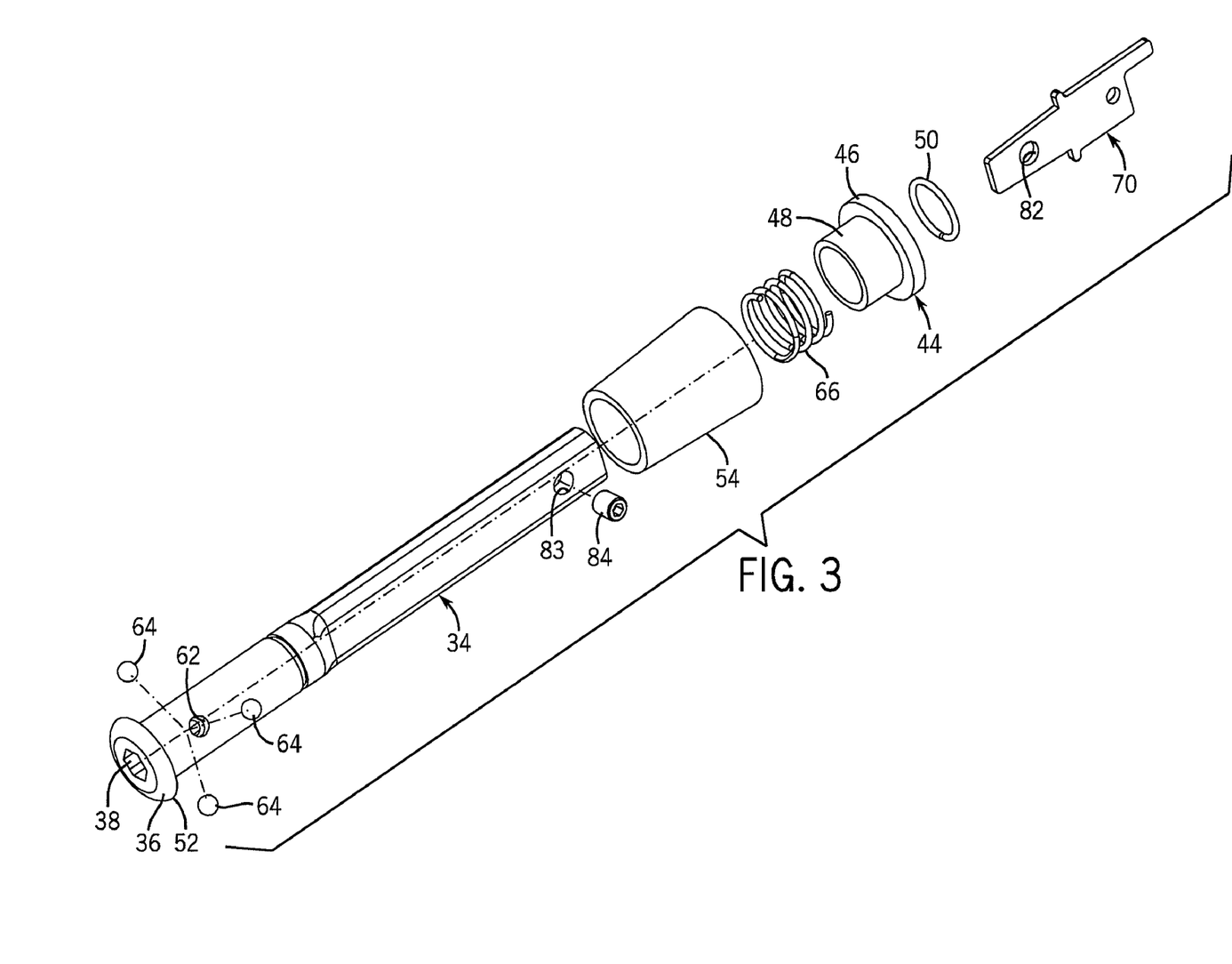
FIG. 3 is an exploded view of the adapter shown in FIG. 2.

Referring now to FIGS. 2-3, quick change tool attachment 20 includes a mounting body 34, the outer end of which forms a part of quick change socket assembly 32. Representatively, mounting body 34 is in the form of an elongated arm or shaft, although it is understood that mounting body 34 may have any satisfactory or desired configuration. The outer end of mounting body 34, shown at 36, is formed to include an inwardly extending passage 38, which has a non-circular cross-section. Representatively, the cross-section of passage 38 may have a hex configuration, although it is understood that any other satisfactory non-circular configuration may be employed. The tool or attachment that is to be secured to quick change socket assembly 32 includes a mounting shaft or arm 40, which has a cross-section that matches that of passage 38. The outer end of arm 40 is formed with an annular groove or recess 42.

Figure 4:
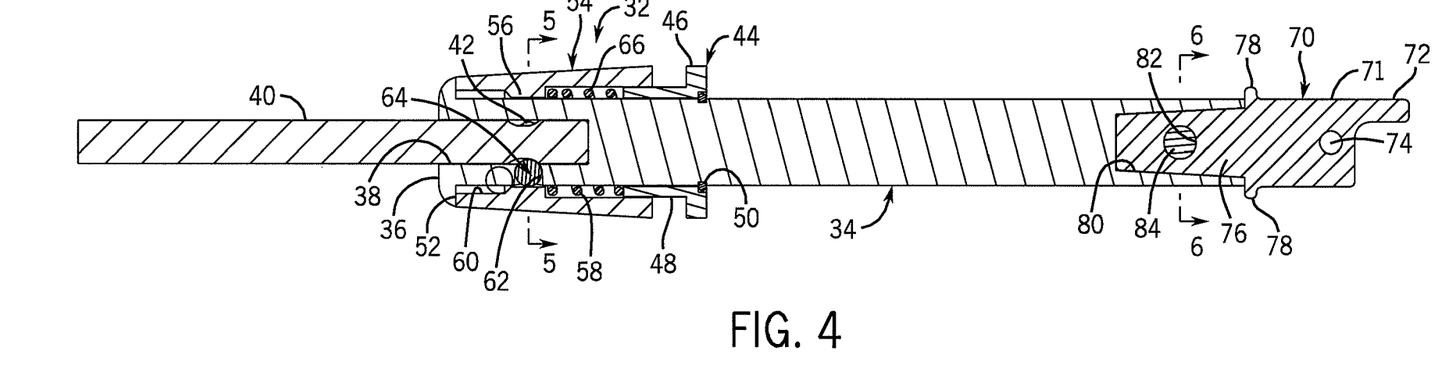
FIG. 4 is a cross-section view of that shown in FIG. 2.
Figure 5:
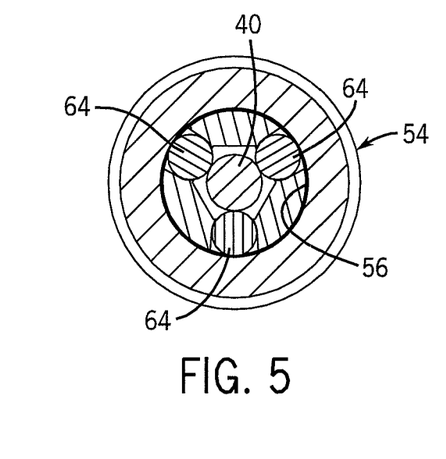
FIG. 5 is a cross-section view taken along lines 5-5 of FIG. 4.

With additional reference to FIGS. 4-5, body 34 includes a fixed collar 44, including an end flange 46 and a side wall 48. A snap ring 50 may be engaged within a groove formed in the outer surface of mounting body 34 and within a mating recess formed in collar 44, for securing collar 44 in position on mounting body 34. The outer end 36 of mounting body 34 is formed with an annular flange 52, and a sleeve 54 is slidably mounted between collar flange 46 and mounting body flange 52. Sleeve 54 includes an inwardly extending locking ring 56. An inner recess 58 is formed inwardly of locking ring 56, and an outer recess 60 is formed outwardly of locking ring 56. The wall of mounting body 34 is formed with a number of passages 62, within which retainers, such as balls 64, are located. A spring 66 bears between the outer end of collar side wall 48 and locking ring 56, for biasing sleeve 54 outwardly to a position in which the outer end of sleeve 54 engages the inner surface of flange 52. With this construction, the user is able to quickly and easily engage a tool or attachment with mounting body 34 by moving sleeve 54 inwardly against the biasing force of spring 66, which moves locking ring 56 out of alignment with balls 64. The shaft or arm 40 of the tool or attachment can then be inserted into passage 38. The user then releases sleeve 54, which moves outwardly under the influence of spring 66 such that locking ring 56 is located over balls 64 so as to force balls 64 into engagement within the groove or recess 42 in the shaft or arm 40. The tool or attachment is thus securely engaged with the end of mounting body 34 by engagement of balls 64 within groove or recess 42. When it is desired to disengage the tool or attachment from mounting body 34, the user again applies an inward force on sleeve 54 against the force of spring 66, so as to move locking ring 56 out of alignment with balls 64. The user then applies an axial outward force on the tool shaft or arm 40. Balls 64 are thus allowed to move outwardly into recess 60 so as to enable the inner end portion of shaft or arm 40 to move outwardly past balls 64. Mounting body 34 has a length that enables the tool or attachment to be located outwardly of the outer surface of shoe 28, to provide sufficient clearance for operation.

At the inner end of quick change tool attachment 20, a removable and replaceable mounting member 70 is engaged with mounting body 34. The outer area of mounting member 70 resembles that of a conventional tool or attachment that is configured for engagement with tool connection area 24 of the driver. Specifically, the outer portion of mounting member 70 is in the form of a flat mounting tongue 71 having an outwardly extending tang 72. An opening 74 is formed in mounting tongue 71. The configuration of tongue 71, tang 72 and opening 74 enables mounting member 70 to be received within the slot defined by tool connection area 24 and secured to driver end 22 using the tool connection area 24 and lever 26.

Figure 6:
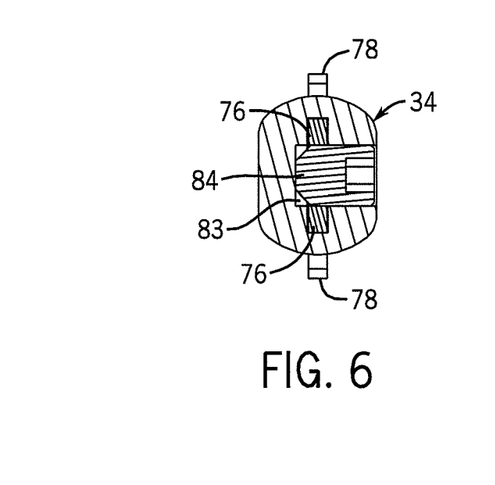
FIG. 6 is a cross-section view taken along lines 6-6 of FIG. 4.

With additional reference to FIG. 6, mounting member 70 also includes an engagement section 76 that extends inwardly from a pair of outwardly extending ears 78, which serve to locate mounting member 70 relative to the end of mounting body 34. In one embodiment, mounting body 34 is formed with a slot 80 that extends inwardly from its inner end, and which has a shape corresponding to that of engagement section 76. Engagement section 76 includes a transverse opening 82 which, when engagement section 76 is fully seated within slot 80, is in alignment with a threaded passage 83 formed in one of the walls of mounting body 34. A threaded engagement member, which may be in the form of a set screw 84, is adapted for engagement within passage 83 and to extend through opening 82 in engagement section 76. In this manner, set screw 84 is operable to releasably retain mounting member 70 in engagement with mounting body 34.

With this construction, mounting member 70 can quickly and easily be removed from mounting body 34 in the event mounting member 70 becomes damaged during use or otherwise requires replacement. The user can simply remove mounting member 70 and replace it with another identically configured mounting member 70, without the need for total replacement of quick change tool attachment 20.

Figure 7:
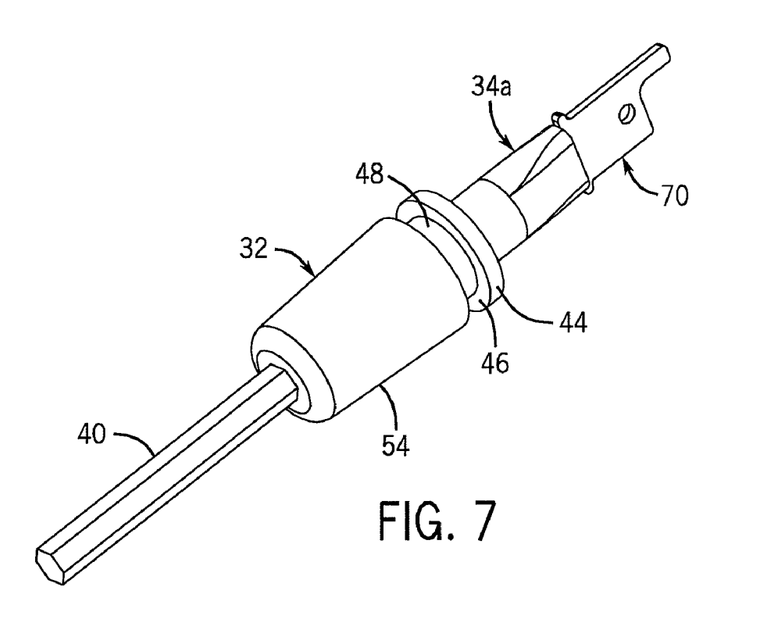
FIG. 7 is an isometric view of an adapter holding an arm of a functional tool according to an alternate embodiment of the present invention.
Figure 8:
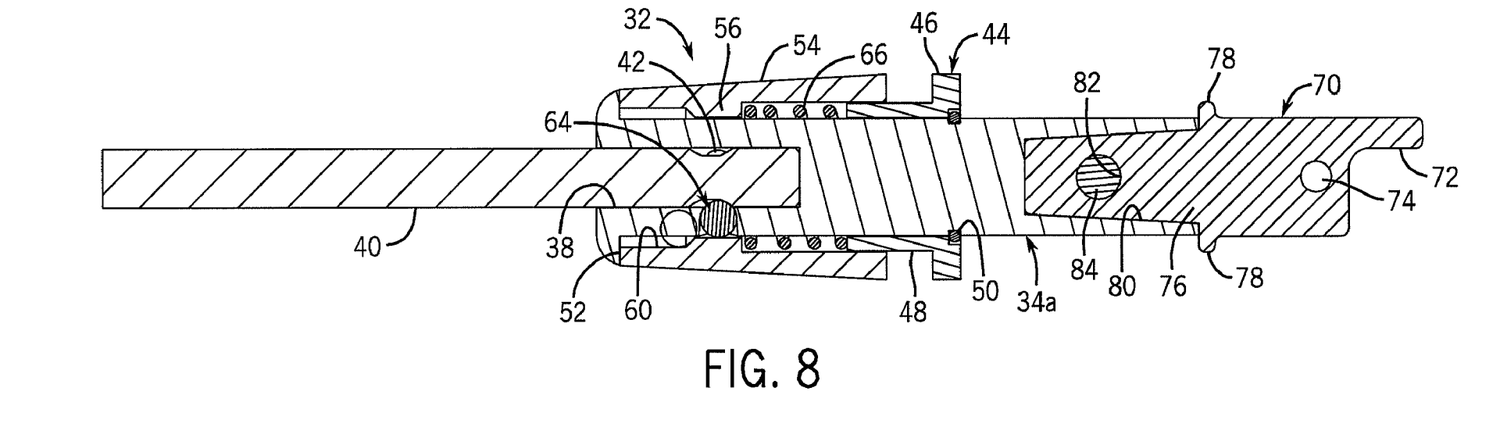
FIG. 8 is a cross-section view of that shown in FIG. 7.

FIGS. 7-8 illustrate another embodiment of an adapter in accordance with the present invention, and like reference characters will be used where possible to facilitate clarity. In this alternate embodiment, a mounting body 34a may be used in place of mounting body 34. The inner and outer ends of mounting body 34a are configured the same as mounting body 34 as shown and described previously. Mounting body 34a has a shorter length than that of mounting body 34, and can be used when shoe 28 is not being used such that extension of the tool or attachment beyond shoe 28 is not required.

Figure 9:
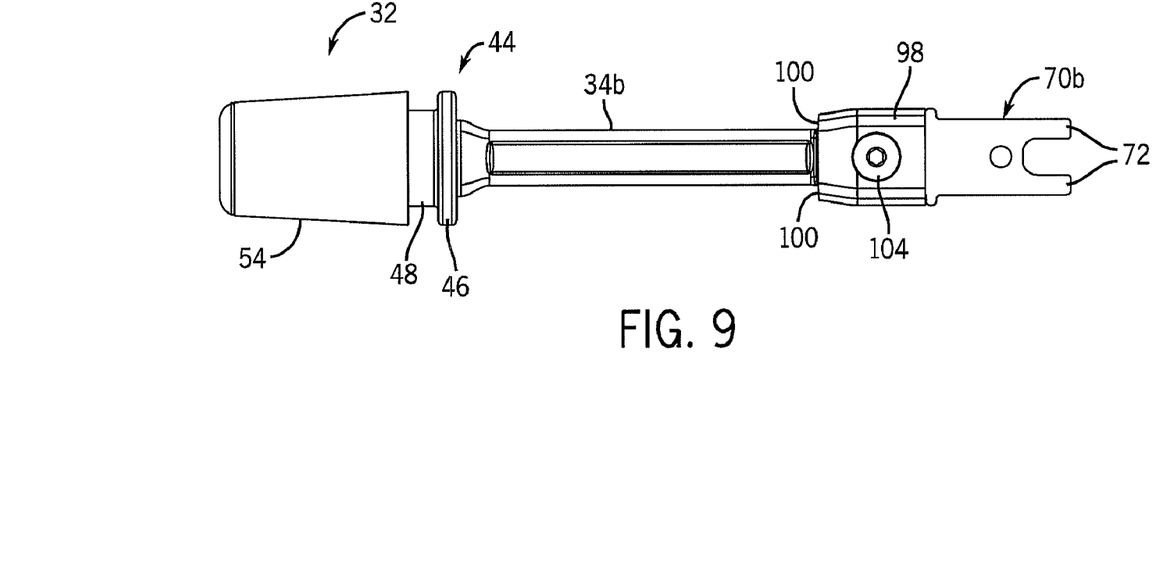
FIG. 9 is a side elevation view of an adapter according to yet another embodiment of the present invention.
Figure 10:
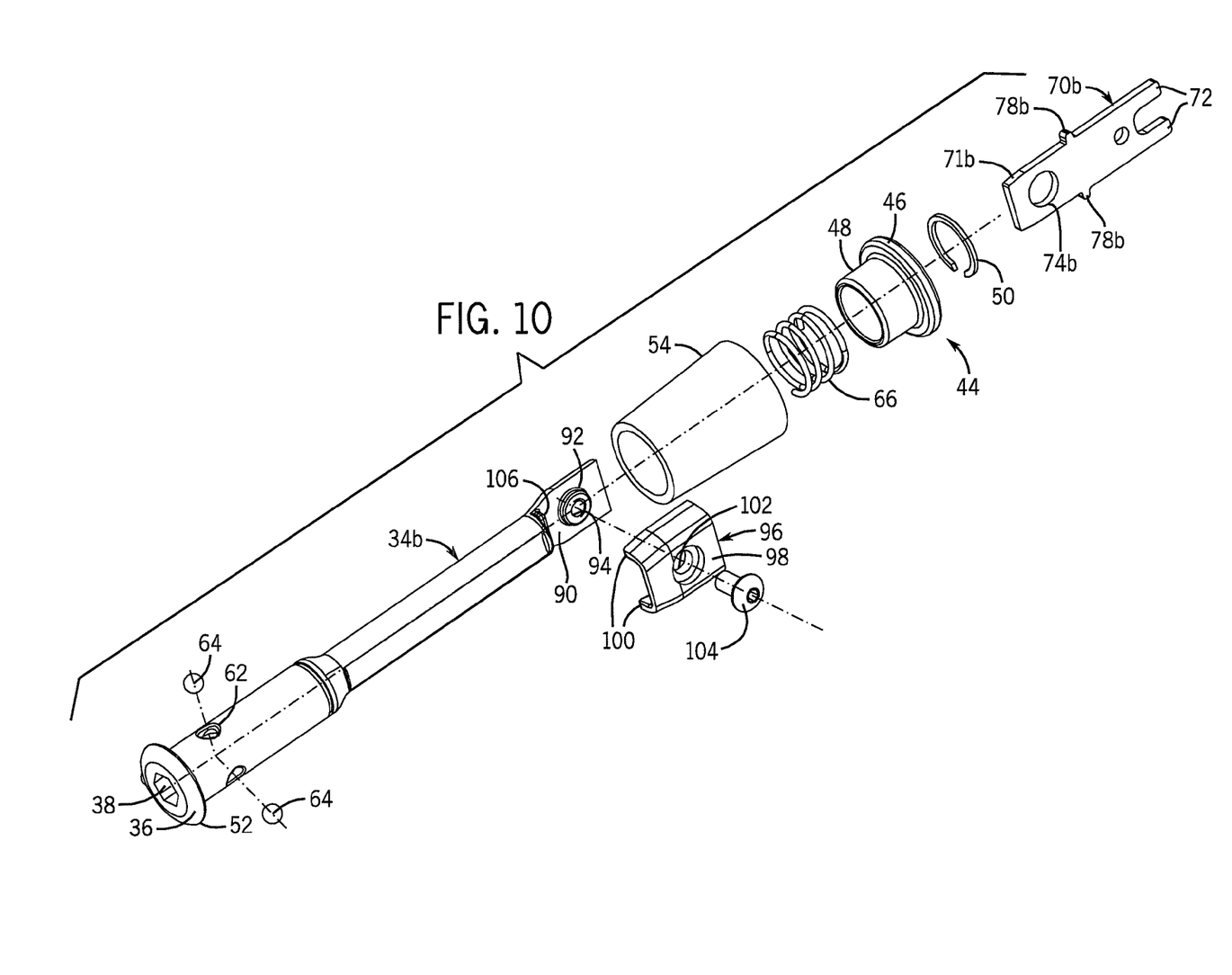
FIG. 10 is an exploded view of the adapter shown in FIG. 9.

FIGS. 9-10 illustrate another embodiment of an adapter in accordance with the present invention, and like reference characters will be used where possible to facilitate clarity. In this alternate embodiment, a mounting body 34b may be used in place of mounting body 34 or 34a. The outer end of mounting body 34b has the same quick change socket assembly 32 as shown and described previously, for use in mounting a tool or attachment to the end of mounting body 34b. A mounting member 70b may be used in place of mounting member 70, although a mounting member such as 70 may also be employed. Mounting member 70b differs from mounting member 70 in that it includes a pair of tangs 72 as opposed to a single tang 72 as in mounting member 70.

Mounting body 34b is formed so as to include a flat engagement surface 90 at its inner end, against which one side of mounting tongue 71b of mounting member 70b is adapted to be positioned. A transverse projection 92 extends from engagement surface 90, and is formed with a threaded internal passage 94. Projection 92 is configured to extend through mounting tongue opening 74b. A clamp member 96 is engageable with the inner end of mounting body 34b for securing mounting member 70b to mounting body 34b. Clamp member 96 is generally C-shaped, including a main wall 98 and a pair of lateral flanges or walls 100. An opening 102 is formed in main wall 98. The shank of a fastener 104, such as a screw, is adapted to pass through opening 102 into engagement with threaded passage 94 in projection 92, while the head of the fastener 104 is engaged with main wall 98. With this construction, mounting member 70b is secured to the end of mounting body 34b by placing one side of mounting tongue 71b against engagement surface 90 such that projection 92 extends through opening 74b. Clamp member 96 is then positioned over the other side of mounting tongue 71b, and fastener 104 is inserted through opening 102 into engagement with threaded passage 94, which forces the inside surface of clamp member main wall 98 against the facing surface of mounting tongue 71b. The end of mounting tongue 71b is located in close proximity to a shoulder 106 defined by mounting body 34b adjacent engagement surface 90, and ears 78b of mounting member 70b are located adjacent the ends of lateral flanges or walls 100 of clamp member 96, so as to ensure that mounting member 70b does not pivot about projection 92. In addition, the inside surfaces of lateral flanges or walls 100 are in close proximity to the upper and lower edges of mounting tongue 71b, to further restrain any movement between mounting member 70b and mounting body 34b.

In the event mounting member 70b is damaged during use or otherwise requires replacement, the user simply removes fastener 104 so as to release clamp member 96 and to enable mounting member 70b to be removed from engagement with mounting body 34b. The user can then replace the damaged mounting member 70b with a replacement mounting member 70b, which is secured to mounting body 34b in the same manner as described previously.

It is recognized that the quick change tool attachment 20 may be used in connection with a wide variety of tools, including brushes, files, sanding shoes, etc. It is understood that any other satisfactory type of tool or attachment may be interconnected with the driver using the quick change tool attachment 20 of the present invention. Also, it is recognized that the viewable portion of the wall of the mounting body may be embossed or otherwise include a product identifier, such as a product name.

Various alternatives and embodiments are contemplated as being within the scope of the following claims particularly pointing out and distinctly claiming the subject matter regarded as the invention.

I claim:

1. A system for use in securing an attachment to a reciprocating driver having an attachment mounting area and a shoe that is spaced outwardly from the attachment mounting area, comprising:
   an attachment mount configured for releasable engagement with an attachment;
   a driver mount interconnected with the attachment mount, wherein the driver mount includes a removable mounting member configured for engagement with the attachment mounting area of the driver; and
   a mounting body extending between and interconnecting the attachment and driver mounts with each other, the mounting body being connected to the driver mount so that the removable mounting member of the driver mount is removable with respect to the mounting body, wherein the mounting body has a length that provides spacing between the attachment mount of the system and the attachment mounting area of the driver such that the attachment and driver mounts of the system are provided on opposing sides of a the shoe of the driver.

2. The system of claim 1 wherein the removable mounting member has (i) at least one tang at a first end thereof that engages the attachment mounting area of the driver, and (ii) a tongue section at a second end thereof that is secured to the mounting body via a selectively engageable clamp member that holds the tongue section of the removable mounting member against the mounting body, such that the tongue section of the removable mounting member is sandwiched between the mounting body and the clamp member.

3. The system of claim 1, wherein the tongue section includes an opening that interfaces with at least one of (i) a fixed projection that extends through the opening to longitudinally locate the removable mounting member with respect to the mounting body, and (ii) a set screw that extends through the opening to longitudinally locate the removable mounting member with respect to the mounting body.

4. The system of claim 1, wherein the tongue section includes a tongue that interfaces with the attachment mount and a pair of tangs, opposite the tongue, that interface with the mounting area of the driver.

5. The system of claim 1, wherein the clamp member includes a set screw.

6. The system of claim 1, wherein the attachment mount is configured to provide a releasable quick connection of the attachment to the driver.

7. The system of claim 1, wherein the attachment mount and driver mount are interconnected such that a reciprocating motion imparted by the driver is translated to the attachment.

8. The system of claim 1, wherein the attachment mount has an inwardly extending passage for receiving an arm of the attachment and wherein the inwardly extending passage has a cross-section matched to that of the arm.

9. The system of claim 8, wherein the inwardly extending passage has a non-circular cross-section.

10. The system of claim 9, wherein the inwardly extending passage has a hexagonal cross-section.

11. A system for use in securing an attachment to a reciprocating driver having an attachment mounting area, comprising:
- an attachment mount configured for releasable engagement with an attachment;
- a driver mount interconnected with the attachment mount, wherein the driver mount includes a removable mounting member configured for engagement with the attachment mounting area of the driver, wherein the removable mounting member has (i) at least one tang at a first end thereof that engages the attachment mounting area of the driver, and (ii) a tongue section at a second end thereof; and
- a mounting body extending between and interconnecting the attachment and driver mounts with each other, wherein the tongue section of the removable mounting member is secured to the mounting body via a selectively engageable clamp member that holds the tongue section of the removable mounting member against the mounting body, such that the tongue section of the removable mounting member is sandwiched between the mounting body and the clamp member.

12. The system of claim 11, wherein the tongue section includes an opening that interfaces with at least one of (i) a fixed projection that extends through the opening to longitudinally locate the removable mounting member with respect to the mounting body, and (ii) a set screw that extends through the opening to longitudinally locate the removable mounting member with respect to the mounting body.

13. The system of claim 11, wherein the tongue section includes a tongue that interfaces with the attachment mount and a pair of tangs, opposite the tongue, that interface with the mounting area of the driver.

14. The system of claim 11, wherein the clamp member includes a set screw.

15. The system of claim 11, wherein the attachment mount is configured to provide a releasable quick connection of the attachment to the driver.

16. The system of claim 11, wherein the attachment mount and driver mount are interconnected such that a reciprocating motion imparted by the driver is translated to the attachment.

17. The system of claim 11, wherein the attachment mount has an inwardly extending passage for receiving an arm of the attachment and wherein the inwardly extending passage has a cross-section matched to that of the arm.

18. The system of claim 17, wherein the inwardly extending passage has a non-circular cross-section.

19. The system of claim 18, wherein the inwardly extending passage has a hexagonal cross-section.

20. A power tool, comprising:
- a hand-held power unit having an axially reciprocating movable output arrangement;
- a driver mount adapted for engagement with the axially reciprocating movable output arrangement using a clamp-type mounting arrangement, wherein the driver mount includes a tongue section;
- an adapter having a generally flat first connector section that is adapted for releasable engagement with the driver mount, and a second connector section having a releasable engagement arrangement that includes at least one retainer that is biased toward a locking position, wherein the flat first connector section of the adapter includes a flat engagement surface and a clamp member cooperating therewith, and wherein the tongue section of the driver mount is sandwiched between the flat engagement surface and the clamp member, wherein the flat engagement surface of the generally flat first connector section of the adapter further comprises a projection extending therefrom and through the tongue section of the driver mount when the driver mount is sandwiched between the flat engagement surface and the clamp member; and
- a functional tool having an inner mounting portion, wherein the inner mounting portion of the functional tool and the releasable engagement arrangement of the second connector section of the adapter are configured and arranged so as to provide engagement of the inner mounting portion of the functional tool with the releasable engagement arrangement without the use of tools by way of the at least one retainer biasing toward the locking position and engaging the inner mounting portion of the functional tool, such that the inner mounting portion of the functional tool is engaged with the releasable engagement arrangement of the second connector section via application of a push-on force to the inner mounting portion of the functional tool in a direction parallel to the direction of movement of the axially reciprocating movable output arrangement of the power unit.

* * * * *

UNITED STATES PATENT AND TRADEMARK OFFICE
CERTIFICATE OF CORRECTION

PATENT NO.       : 7,984,914 B1                                 Page 1 of 1
APPLICATION NO.  : 11/759069
DATED            : July 26, 2011
INVENTOR(S)      : Scott A. Paulsen It is certified that error appears in the above-identified patent and that said Letters Patent is hereby corrected as shown below:

CLAIM 1, column 6, line 45, delete "a".

Signed and Sealed this
Thirteenth Day of September, 2011

David J. Kappos
*Director of the United States Patent and Trademark Office*